United States Patent
Berard et al.

(10) Patent No.: US 8,155,866 B2
(45) Date of Patent: Apr. 10, 2012

(54) METHOD AND DEVICE FOR GUIDING AN AIRCRAFT

(75) Inventors: Jeremy Berard, Castelnau d'Estretefonds (FR); Christophe Bouchet, Toulouse (FR); Emmanuel Blanvillain, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 404 days.

(21) Appl. No.: 12/422,542

(22) Filed: Apr. 13, 2009

(65) Prior Publication Data

US 2009/0259392 A1    Oct. 15, 2009

(30) Foreign Application Priority Data

Apr. 14, 2008 (FR) ...................................... 08 02039

(51) Int. Cl.
*G06F 19/00* (2011.01)
(52) U.S. Cl. ........................................................ 701/120
(58) Field of Classification Search .................. 701/3–4, 701/7, 13–14, 16, 120, 121, 204, 206, 211
See application file for complete search history.

(56) References Cited

U.S. PATENT DOCUMENTS

| 5,121,325 A * | 6/1992 | DeJonge ........................ 701/123 |
| 2005/0143904 A1* | 6/2005 | Haas ............................. 701/120 |
| 2006/0265110 A1 | 11/2006 | Ferro |
| 2008/0001024 A1 | 1/2008 | Bouchet |

FOREIGN PATENT DOCUMENTS

| FR | 2 863 372 | 6/2005 |
| FR | 2 870 607 | 11/2005 |
| FR | 2 897 154 | 8/2007 |

OTHER PUBLICATIONS

Preliminary Search Report dated Nov. 20, 2008 w/ English translation.

* cited by examiner

*Primary Examiner* — Kim T Nguyen
(74) *Attorney, Agent, or Firm* — Dickinson Wright PLLC

(57) ABSTRACT

Disclosed is a method and device for guiding an aircraft flying along a flight trajectory. The flight trajectory has at least one constrained section, and the aircraft flies at a required speed within the constrained section to comply with a required arrival time at a predetermined waypoint in the constrained section. Auxiliary speed setpoints are determined to guide the aircraft to arrive at an auxiliary arrival tune at an auxiliary waypoint, with the auxiliary speed setpoints being applied by a guidance system to guide the aircraft.

10 Claims, 4 Drawing Sheets

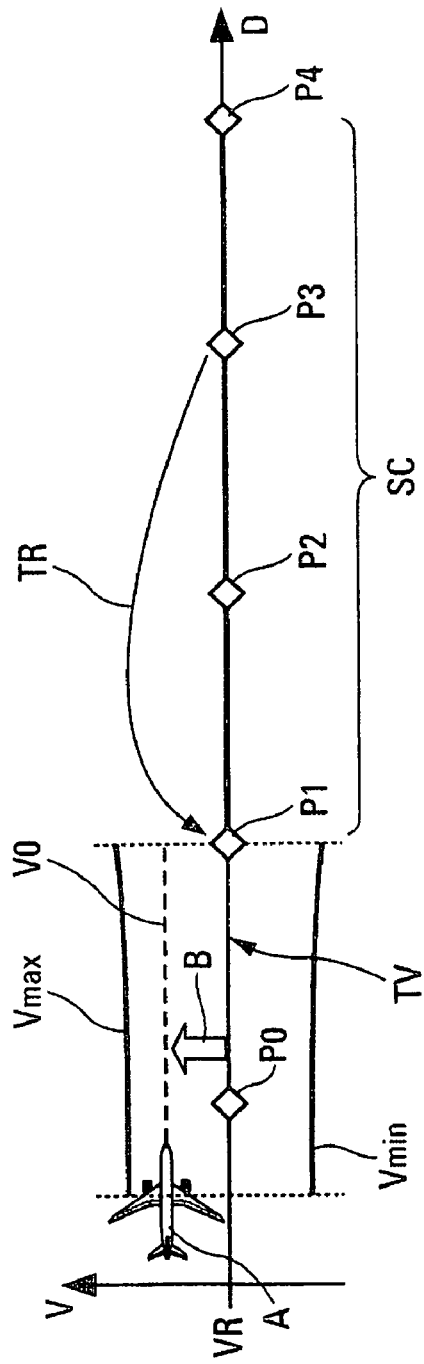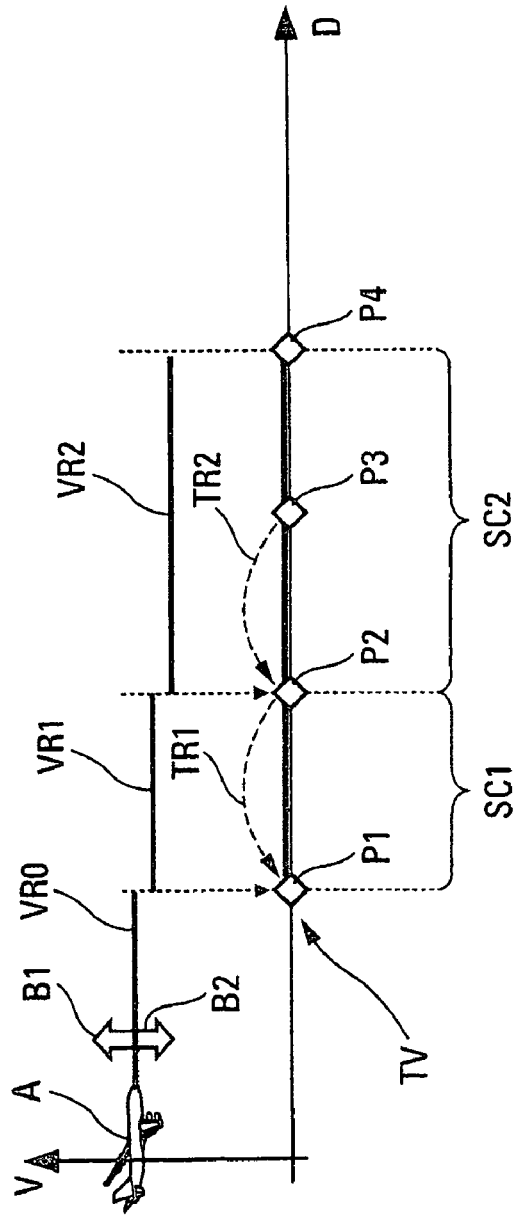

METHOD AND DEVICE FOR GUIDING AN AIRCRAFT

FIELD OF THE INVENTION

The present invention relates to a method and a device for guiding an aircraft, which flies along a flight trajectory and which must comply with at least one time constraint.

BACKGROUND OF THE INVENTION

Within the framework of the present invention, it is considered that a time constraint is a constraint which requires a given arrival time, of RTA ("Required Time of Arrival") type, at a particular waypoint of the flight trajectory followed by the aircraft.

The management of a time constraint along a flight plan followed by an aircraft generally presents drawbacks which limit the field of application of the various solutions implemented for complying with this time constraint.

Specifically, to compensate for an advance or a delay with respect to a scheduled timetable, a speed modulation is generally implemented. It is also possible to envisage lengthening or shortening the flight trajectory followed. However, certain parts or sections of the flight trajectory, along the flight plan followed, are themselves constrained by the speed, that is to say depend on the speed. In particular, the vertical trajectories, especially a climb or descent (vertical) profile, generally depend on the speed of the aircraft.

Hence, the modulation of the speed during such a climb (or descent) phase leads to a modification of the slopes flyable by the aircraft and therefore involves a choice of strategy, namely:
- according to a first strategy, try to fly along predetermined climb and/or descent profiles, with speeds other than those for which these profiles have been determined; or
- according to a second strategy, recalculate the climb and/or descent profiles as a function of the new speeds, obtained following the speed modulation.

The choice of one of these strategies does not involve appreciable consequences during an aircraft climb phase, other than the displacement (in time or in distance) of the point of arrival in the cruising phase. With regard to a descent phase, the consequences are different depending on whether the aircraft is already or is not yet descending, upon implementing the chosen strategy. When the aircraft is not yet descending, the point at which it begins descending moves ahead of the aircraft so that the consequences are slight.

On the other hand, when the aircraft is near to or on the descent profile, a speed modulation (in accordance with the first aforementioned strategy) tends to move the aircraft away from this profile, and this may run counter to the desired effect relating to the upholding of the time constraint. Furthermore, a new calculation of a profile (in accordance with the second aforementioned strategy) involves a new relative position of the aircraft above or below this new profile, and therefore corrective actions so as to converge towards this new profile, which corrective actions run counter to compliance with the time constraint.

These various problems and the drawbacks in solving them (algorithmic complexity, complexity of the guidance laws, overconsumption of fuel, passenger discomfort, etc.) have led aircraft manufacturers and equipment manufacturers to exclude, at least partially, the descent profile from the field of application of the solutions implemented for ensuring the upholding of a time constraint. This generally results either in the exclusion or the prohibition of time constraints on the descent and approach phases, or in a more or less significant reduction in the aircraft's abilities to compensate for an advance or a delay as soon as it is engaged on a descent profile.

The previous limitations entail an increased risk of the aircraft not being able to comply with the time constraint and therefore, for example, missing a landing slot on a congested airport, thus involving the following of a waiting circuit, additional holdups, additional consumption, cost overheads, etc.

Additionally, it is known that the requirements to uphold time constraints are increased for military aircraft, such as military transport airplanes. In this case, the margins to be complied with are only a few seconds, and it may turn out that the aircraft has to manage up to five different time constraints. Moreover, these may be positioned anywhere in the flight plan, including along low-altitude flight sections, which are yet more constrained than the aforementioned descent phases. A method for constructing a low-altitude flight trajectory section is known from documents FR-2 870 607 and FR-2 897 154.

It is known that the low-altitude flight sections are generally formed of a succession of climb and descent segments, intended to allow the aircraft to overfly the relief as closely as possible. These sections are constrained by the speed, just like the aforementioned climb or descent phases, but two additional constraints are added to this speed constraint, namely:
- the flight speed along a low-altitude flight section is a speed which is required by the crew. It exhibits an operational dimension and it should therefore only be modified (or modulated) in an extreme situation; and
- the calculation of a new low-altitude flight section exhibits a high calculation time and is potentially troublesome for the crew during the conduct of the mission. Hence, the number of such calculations must be minimized.

The object of the present invention is to remedy the aforementioned drawbacks. It relates to a method of guiding an aircraft flying along a flight trajectory comprising at least one constrained section, with which a required speed is associated. This signifies that the characteristics (slope, etc.) of this constrained section are calculated (and generally optimized) while taking account of a speed at which the aircraft is supposed to fly along said section. Moreover, the aircraft must comply with at least one time constraint which, by definition, requires a given arrival time at a particular waypoint of said constrained section of the flight trajectory.

The aim of said guidance method is to ensure a precise arrival time, to within a few seconds, at the level of said particular waypoint of the flight trajectory, while guiding the aircraft along at least one constrained section of the flight trajectory, that is to say of at least one section with which a required speed is associated.

For this purpose, according to the invention, said method according to which in the course of the flight:
A/ speed setpoints are determined which, when they are applied to the aircraft during the flight along said flight trajectory, allow it to arrive at said waypoint at said required arrival time; and
B/ during the guidance of the aircraft along said flight trajectory, said speed setpoints are applied to it,
is noteworthy in that:
an auxiliary arrival time is determined, at which the aircraft must arrive at an auxiliary waypoint which corresponds to the start of said constrained section, so as to be able to comply with said time constraint, said auxiliary arrival time being determined as a function of the distance between said waypoint and said auxiliary waypoint and as a function of the required speed for said constrained section;

in step A/, auxiliary speed setpoints are determined allowing the aircraft to arrive at said auxiliary arrival time at said auxiliary waypoint representing the start of said constrained section; and in step B/, said auxiliary speed setpoints are applied to the aircraft, upstream of said constrained section in the direction of flight (along the flight trajectory), so that at said auxiliary arrival time said aircraft arrives at said auxiliary waypoint representing the start of said constrained section and that it thus complies with said time constraint, while being able thereafter to fly at said required speed along said constrained section.

Thus, by virtue of the invention, the time constraint is transposed to the start of the constrained section, with which a required speed is associated, so that:

on the one hand, it is possible to comply with said time constraint, the auxiliary arrival time being determined as a function of the distance between said waypoint and said auxiliary waypoint and as a function of the required speed for the constrained section, as specified below;

on the other hand, the guidance of the aircraft, which is carried out mainly with the aid of a speed modulation, so as to comply with said time constraint, is carried out upstream of the constrained section so that no speed modulation (except for implementing certain corrections) need be carried out on said constrained section so as to comply with the time constraint. Consequently, said constrained section can be flown at the required speed (for which it has been constrained).

Thus, by virtue of the invention, to comply with the time constraint, it is not necessary as in the aforementioned standard solutions:

to recalculate the flight trajectory at the level of said constrained section; or to fly the aircraft along said constrained section at a different speed from the required speed, thereby making it possible to remedy the aforementioned drawbacks.

SUMMARY OF THE INVENTION

In this particular embodiment, said flight trajectory comprises a plurality of directly successive constrained sections, of which that furthest downstream is associated with a time constraint, auxiliary arrival times are calculated for the various auxiliary waypoints which correspond to the respective starts of said constrained sections, from downstream to upstream, with the aim of complying with said time constraint, doing so beginning with the constrained section furthest downstream and using for each new constrained section the auxiliary arrival time determined for the start of the preceding downstream section, in step A/, auxiliary speed setpoints are determined allowing the aircraft to arrive at the start of the constrained section furthest upstream at the corresponding auxiliary arrival time, and in step B/, said auxiliary speed setpoints are applied to the aircraft, upstream of said constrained section furthest upstream, so that at said auxiliary arrival time it arrives at said auxiliary waypoint representing the start of said constrained section furthest upstream and that it thus complies with said time constraint, while being able to fly at the required speeds along said successive constrained sections.

Said constrained section can be a descent phase such as aforementioned, which is followed in particular during a landing of a transport airplane. Nevertheless, in a preferred embodiment, said constrained section is a low-altitude flight section, of LLF ("Low Level Flight") type, which is followed preferably by a military aircraft.

It will be noted that, by virtue of the invention, the following advantages in particular are obtained, especially during a flight along a constrained section of LLF type:

a simplification of the calculation of predictions. No iteration along the constrained section is in fact necessary and it is possible to reuse, in the military field, the algorithms already existing in the civilian flight phases;

this simplification permits simplified introduction of different guidance laws in the descent phases of a transport airplane or in a low-altitude flight constrained section of LLF type;

preservation of the speed setpoint on the low-altitude flight section of LLF type;

an increase in the rate of upholding of the time constraint inside the LLF section; and simplification of the flight and easing of the workload of the crew during the flight along an LLF section.

Furthermore, in an advantageous manner, to determine said low-altitude flight (LLF) constrained section, an auxiliary required speed is taken into account which represents the minimum speed between:

on the one hand, the sum of the initial required speed for said constrained section and of a predetermined speed margin; and on the other hand, a maximum operational speed of VMO type.

By virtue of the consideration of this auxiliary required speed, the low-altitude flight constrained section is rendered flyable at the initial required speed while taking account of said speed margin.

Furthermore, advantageously, when the aircraft enters a low-altitude flight constrained section (of LLF type) exhibiting a required speed:

this required speed is transformed into a ground speed setpoint; and this ground speed setpoint is used as speed setpoint to be applied to the aircraft, this ground speed setpoint being adjusted periodically as a function of advance or delay information cues which are determined in a periodic manner.

The aim of the laws for calculating the ground speed setpoint is to ensure that the aircraft will have compensated for its advance or its delay at a given horizon (in terms of time or distance) ahead of the aircraft. The dedicated gain adjustment makes it possible to define this horizon and therefore determines the dynamics of the function, thereby inducing more or less crisp variations in ground speed. Advantageously, the adjustment of the gains is carried out as a function of the type of aircraft and of its engine dynamics so as to ensure good effectiveness while permitting satisfactory flight comfort.

The guidance carried out with the aid of a ground speed setpoint exhibits numerous advantages, and in particular:

it guarantees compliance with the time constraint with the required precision, for example plus or minus five seconds, and it permits high reactivity in relation to meteorological disturbances such as a headwind or tailwind;

the slaving by ground speed setpoint is rendered independent of the iterative calculation (calculation loop) of the predictions along the flight trajectory. The ideal predictions are frozen on entry to the low-altitude flight constrained section. The ground position information cue suffices to provide the advance or delay information cue, and therefore makes it possible to correct the ground speed setpoint in a very reactive manner, the calculation cycles being very short. Thus, compliance with the time constraints on the low-altitude flight constrained section (of LLF type) is improved, and consequently so is the success rate of the missions; and the guidance does not require any loop for calculating predictions, thereby easing the workload of a central computer used.

Additionally, in an advantageous manner, in the course of a flight of the aircraft along a constrained section:

a remaining distance is determined, representing the distance remaining to be traversed until the next waypoint with which a time constraint is associated;

a first distance is determined by multiplying the time remaining until said time constraint by a minimum speed which represents the required speed for said current constrained section, from which a first speed margin has been subtracted;

a second distance is determined by multiplying the time remaining until said time constraint by a maximum speed which represents the required speed for said current constrained section, to which a second speed margin has been added;

said remaining distance is compared with said first and second distances, and it is concluded:

that said time constraint is realizable, if said remaining distance lies between said first and second distances; and that said time constraint is not realizable, otherwise; and a corresponding information cue is presented on a viewing screen of the aircraft.

Thus, the crew of the aircraft knows whether or not the time constraint is realizable.

Furthermore, in an advantageous manner, in the course of a flight of the aircraft along a constrained section:

a time deviation is determined between, on the one hand, the arrival time relating to the next time constraint, and, on the other hand, a time corresponding to the ratio between the distance up to the waypoint (which relates to this next time constraint) and a required speed for the current constrained section; and this time deviation is presented on a viewing screen of the aircraft.

Thus, the crew of the aircraft is aware of the time deviation that it is sought to compensate. This time deviation can be negative or positive depending on whether the aircraft is late or early (delayed or advanced). Moreover, this time deviation can be prohibitive, so that the time constraint is not realizable, when the advance (or the delay) that it is sought to make good involves flying at a lower (or higher) speed than that permitted by the speed margins.

Furthermore, advantageously, at least one of the following information cues is moreover determined and presented on a viewing screen of the aircraft:

a correction distance to be taken into account in the flight trajectory, between the current position of the aircraft and a waypoint, so as, if appropriate, to return a speed setpoint to an initial value; and a speed value making it possible to satisfy the time constraint by taking account of the advance or the delay aggregated from the start of the flight along the current section.

The present invention also relates to a device for guiding an aircraft flying along a flight trajectory comprising at least one constrained section, with which a required speed is associated, said aircraft having to comply with at least one time constraint requiring a given arrival time at a particular waypoint of said constrained section of the flight trajectory.

According to the invention said device of the type comprising:

a flight management system for determining speed setpoints which, when they are applied to the aircraft during the flight along said flight trajectory, allow it to arrive at said waypoint at said required arrival time; and a guidance system which guides the aircraft along said flight trajectory, by applying said speed setpoints to it, is noteworthy in that:

said device comprises, moreover, means for determining an auxiliary arrival time, at which the aircraft must arrive at an auxiliary waypoint which corresponds to the start of said constrained section, so as to be able to comply with said time constraint, said auxiliary arrival time being determined as a function of the distance between said waypoint and said auxiliary waypoint and as a function of the required speed for said constrained section;

said flight management system is formed so as to determine auxiliary speed setpoints allowing the aircraft to arrive at said auxiliary arrival time at said auxiliary waypoint (representing the start of said constrained section); and said guidance system is formed so as to apply said auxiliary speed setpoints to the aircraft, upstream of said constrained section in the direction of flight (along the flight trajectory), so that at said auxiliary arrival time it arrives at said auxiliary waypoint representing the start of said constrained section and that it thus complies with said time constraint, while being able thereafter to fly at said required speed along said constrained section.

The present invention also relates to an aircraft which comprises a device such as the aforementioned.

BRIEF DESCRIPTION OF THE DRAWINGS

The figures of the appended drawing will elucidate the manner in which the invention may be embodied. In these figures, identical references designate similar elements.

FIG. 2 is a graphic making it possible to highlight an essential characteristic of a device in accordance with the invention.

FIG. 3 is a graphic making it possible to highlight a characteristic in accordance with a particular embodiment of the invention.

DETAILED DESCRIPTION OF THE INVENTION

Figure 1:
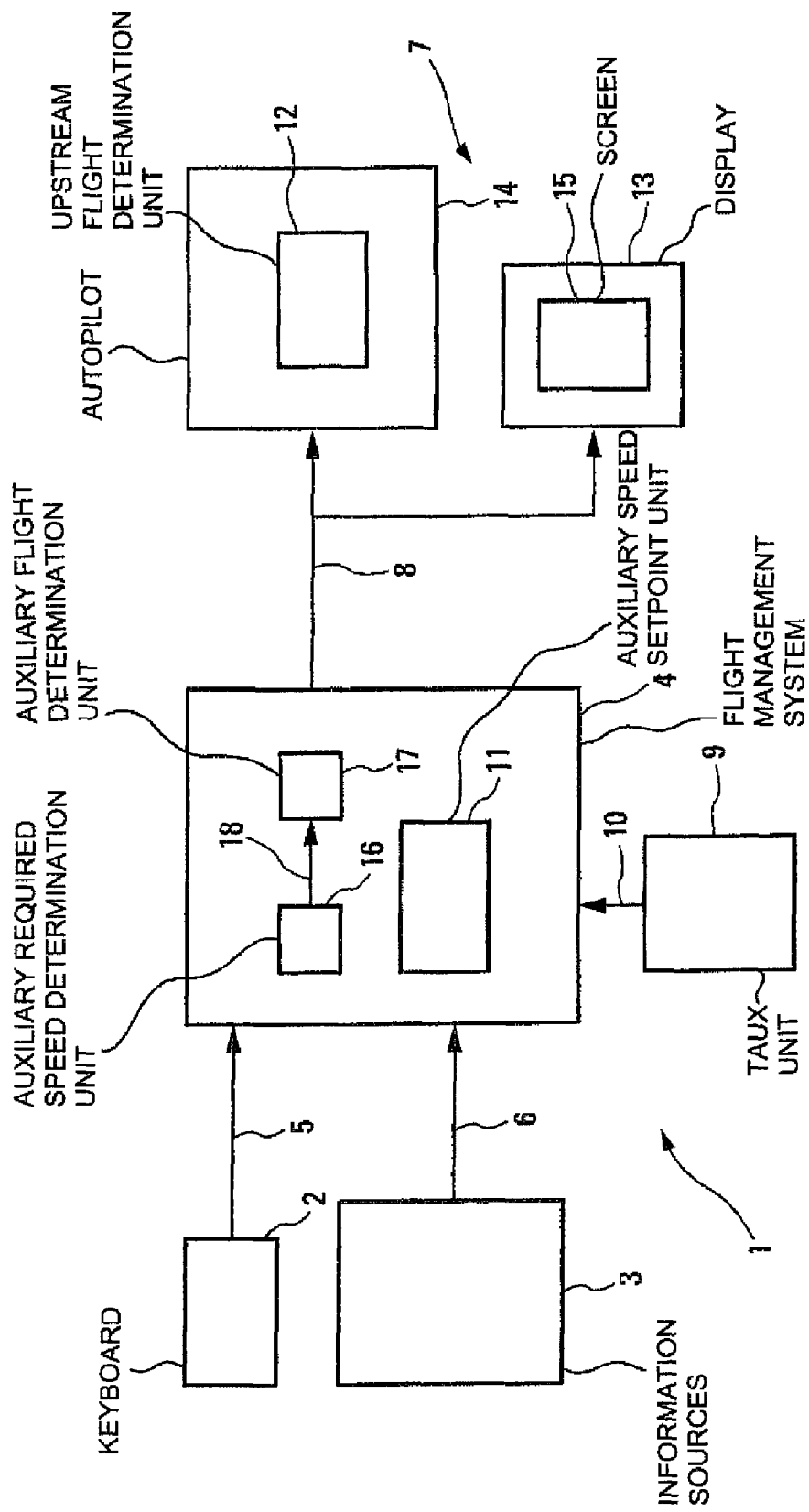
FIG. 1 is the schematic diagram of a guidance device in accordance with the invention.

The device 1 in accordance with the invention and schematically represented in FIG. 1 is intended to guide an aircraft A flying along a flight trajectory TV (which passes through waypoints P0, P1, P2, P3 and P4 in the example of FIG. 2). This aircraft A, for example a transport airplane, civilian or military, must comply with at least one time constraint.

Within the framework of the present invention, it is considered that a time constraint is a constraint which requires a given arrival time, of RTA ("Required Time of Arrival") type, at a particular waypoint of the flight trajectory TV followed by the aircraft A.

Accordingly, said device 1, which is onboard the aircraft A, comprises in a standard manner:
- standard means 2, for example a keyboard, allowing an operator, in particular a pilot of the aircraft A, to enter at least one time constraint of RTA type, which indicates an arrival time required at a particular waypoint, that the aircraft A must uphold during a flight;
- a set 3 of information sources which are able to determine the values of parameters, such as the wind, the temperature or the position of the aircraft A, which relate to the flight of said aircraft A;
- a flight management system 4, for example of FMS type, which is connected by way of links 5 and 6 respectively to said means 2 and to said set 3, which receives information cues from them, and which determines in particular speed setpoints which, when they are applied to the aircraft A during the flight along said flight trajectory TV, allow it to arrive at said waypoint at said required arrival time; and
- a standard guidance system 7 which is connected by way of a link 8 to said flight management system 4 and which guides the aircraft A along said flight trajectory TV, by applying to it the speed setpoints received from said flight management system 4.

Said guidance system 7 comprises, in particular, standard actuation means (not represented) for actuating control members of the aircraft A, which are able to act on the flight of the aircraft A, for example control surfaces (yaw, pitch, roll) and engines. Said actuation means receive orders which are such that the aircraft A follows in particular said aforementioned speed setpoints.

Within the framework of the present invention, said flight trajectory TV comprises at least one constrained section SC, with which a required speed VR is associated, as represented in FIG. 2. This signifies that the characteristics (slope, etc.) of this constrained section SC are calculated (and generally optimized) by taking account of particular parameters, and especially of a speed VR at which the aircraft A is supposed to fly along said section SC. Hence, the aim of the guidance device 1 in accordance with the invention is to ensure a precise arrival time RTA, to within a few seconds, at the level of a particular waypoint (for example the waypoint P3 of the constrained section SC which comprises the waypoints P1, P2, P3 and P4 in the example of FIG. 2) of the flight trajectory TV, while guiding the aircraft A along at least one constrained section SC of said flight trajectory TV, that is to say at least one section SC with which a required speed VR is associated.

For this purpose, according to the invention:
- said device 1 comprises, moreover, means 9 which are for example connected by way of a link 10 to said flight management system 4 (or which are integrated into said flight management system 4), and which are formed so as to determine an auxiliary arrival time Taux, at which the aircraft A must arrive at an auxiliary waypoint P1 which corresponds to the start of said constrained section SC (in the direction of flight), so as to be able to comply with said time constraint at said waypoint P3. According to the invention, this auxiliary arrival time Taux is determined as a function of the distance L between said waypoint P3 and said auxiliary waypoint P1, as a function of said arrival time required RTA at said waypoint P3, and as a function of the required speed VR for said constrained section SC, doing so with the aid of the following expression:

$$T\text{aux} = RTA - (L/VR);$$

- said flight system 4 comprises, moreover, means 11 which determine auxiliary speed setpoints allowing the aircraft A to arrive at said auxiliary arrival time Taux at said auxiliary waypoint P1 representing the start of said constrained section SC; and
- said guidance system 7 comprises moreover means specified below, in particular means 12, which apply to the aircraft A, during a flight (along the flight trajectory TV) upstream of said constrained section SC, said auxiliary speed setpoints determined by said means 11, so that at said auxiliary arrival time Taux the aircraft A arrives at said auxiliary waypoint P1 representing the start of said constrained section SC and that it thus complies with said time constraint RTA (at said waypoint P3), while being able thereafter to fly at said required speed VR along said constrained section SC.

In a preferred embodiment, said guidance system 7 comprises an automatic pilot 14 which comprises said means 12 which automatically apply, in a standard manner, said auxiliary speed setpoints to the aircraft A.

In a particular embodiment, said guidance system 7 can also comprise display means 13 which are intended to display on a screen 15 information cues relating to the guidance of the aircraft A, and in particular said auxiliary speed setpoints. In this particular embodiment, a pilot can guide the aircraft manually in accordance with the auxiliary speed setpoints displayed on the screen 15.

Thus, the device 1 in accordance with the invention transposes (as illustrated by an arrow TR in FIG. 2) the time constraint RTA to the start P1 of the constrained section SC, with which a required speed VR is associated, so that:
- on the one hand, the aircraft A is able to comply with said time constraint RTA (at said waypoint P3), the auxiliary arrival time Taux being determined, in particular, as a function of the distance L between said waypoint P3 and said auxiliary waypoint P1 and as a function of the required speed VR for the constrained section SC; and
- on the other hand, the guidance of the aircraft A, which is carried out mainly with the aid of a speed modulation as illustrated by an arrow B in FIG. 2 which presents the speed V as a function of the distance D along the flight trajectory TV (the aircraft A flying at a speed VO which lies between its maximum speed Vmax and its minimum speed Vmin), so as to comply with said time constraint RTA, is carried out upstream of the constrained section SC. Thus, no speed modulation (except for implementing certain corrections) need be carried out on said constrained section SC to comply with the time constraint RT. Consequently, said constrained section SC can be flown at the required speed VR (for which it has been constrained).

When the aircraft A is flying upstream (in the direction of flight) of the constrained section SC, the device 1 in accordance with the invention ensures the satisfaction of the time constraint RTA (transposed to entry of the section SC) by using a standard speed modulation, that is to say by providing the aircraft A (or its crew) with a speed setpoint estimated on the basis of an interactive prediction calculation. The speed setpoint is bounded at all points of the trajectory by the envelope of speeds (Vmin, Vmax) of the aircraft A. In this case, the device 1 brings the aircraft A to the entrance of the constrained section SC; while complying with the transposed time constraint, so as to now have nothing to do, during the flight along this constrained section SC, other than manage the advance or the delay induced by the vagaries of the flight (along this section SC).

Thus by virtue of the invention, to comply with the time constraint RTA, it is not necessary as in standard solutions:
- to recalculate the flight trajectory TV at the level of said constrained section SC; or
- to fly the aircraft A along said constrained section SC at a different speed from the required speed VR.

In a particular embodiment, when the aircraft A is already flying on the constrained section SC, and only at that moment, when starting the implementation of the guidance in accordance with the invention, the speed-related guidance function can ensure a slight speed modulation to counter the meteorological vagaries. This speed modulation is strictly limited in terms of upper speed and lower speed and it is centered on the speed required for this constrained section. The limitations of the speed modulation, within the constrained sections, ensure that the trajectory remains flyable and condition both the flight safety and the possibility of satisfying the time constraint.

In a particular embodiment represented in FIG. 3:
- said flight trajectory TV comprises a plurality of directly successive constrained sections SC1 and SC2 (exhibiting different required speeds VR1 and VR2), of which that SC2 furthest downstream (in the direction of flight) is associated with a time constraint RTA;
- the means 9 calculate auxiliary arrival times Taux1, Taux2 for the various auxiliary waypoints which correspond to the respective starts P1, P2 of said constrained sections SC1, SC2, from downstream to upstream, with the aim of complying with said time constraint. The means 9 carry out these calculations beginning with the constrained section SC2 furthest downstream and using for each new constrained section the auxiliary arrival time determined for the start of the preceding downstream section, said transpositions being highlighted by arrows TR1 and TR2 in FIG. 3. Thus, on the basis of the time constraint RTA at the waypoint P3 of the constrained section SC2, the means 9 calculate:
  - an auxiliary time Taux2 transposed to the entry P2 of this section SC2, with the aid of the expression: Taux2=RTA−(L2/VR2), L2 being the distance between the waypoints P2 and P3; and
  - a corresponding auxiliary time Taux1, which is transposed to the entry P1 of the section SC1 upstream, with the aid of the expression: Taux1=Taux2−(L1/VR1), L1 being the distance between the waypoints P1 and P2, that is to say the length of the section SC1;
- the flight management system 4 determines auxiliary speed setpoints allowing the aircraft A to arrive at the start P1 of the constrained section SC1 furthest upstream, at the corresponding auxiliary arrival time Taux1; and
- said guidance system 7 applies said auxiliary speed setpoints to the aircraft A, upstream of said constrained section SC1 furthest upstream, so that at said auxiliary arrival time Taux1 it arrives at said auxiliary waypoint P1 representing the start of said constrained section SC1 furthest upstream and that it thus complies with said time constraint RTA (at said waypoint P3), while being able to fly at the required speeds VR1, VR2 along said successive constrained sections SC1 and SC2. In the example of FIG. 3, the aircraft A is flying upstream of the constrained section SC1 at a speed VRO, at which a speed modulation can be carried out, as illustrated by arrows B1 and B2.

Said constrained section SC can be a descent phase which is followed, in particular, during a landing of a transport airplane. Nevertheless, in a preferred embodiment, said constrained section SC is a low-altitude flight section, of LLF ("Low Level Flight") type, which is followed preferably by a military aircraft.

It will be noted that, by virtue of the invention, the following advantages in particular are obtained, especially during a flight along a constrained section SC of LLF type:
- simplification of the calculation of predictions. No iteration along the constrained section SC is in fact necessary and it is possible to reuse in the military field the algorithms already existing in the civilian flight phases;
- this simplification permits simplified introduction of different guidance laws in the descent phases of a transport airplane or in a low-altitude flight constrained section of LLF type;
- preservation of the speed setpoint on the low-altitude flight section of LLF type;
- an increase in the rate of upholding of the time constraint inside the LLF section; and
- simplification of the flight and easing of the workload of the crew during the flight along an LLF section.

The constraint transposition, implemented by the device 1 in accordance with the invention, responds to the requirement to preserve the initial speed setpoints applicable to the constrained section SC, for example of LLF type, these setpoints having a significant operational dimension (go slowly in steep-sided valleys or rapidly overfly zones exposed to an enemy threat). Accordingly, the time constraint or constraints are transposed, while prioritizing the closest, to the entry of the constrained section concerned or to the entry of the adjacent constrained sections if appropriate.

Additionally, in a particular embodiment, said device 1 comprises, moreover, means 16 for determining an auxiliary required speed and means 17 which are connected by way of a link 18 to said means 16 and which are formed so as to determine a low-altitude flight constrained section of LLF type by taking into account, not the initial required speed, but this auxiliary required speed calculated by said means 16. In this case, said means 16 which can form part (as well as said means 17) of the flight management system 4, determine as auxiliary required speed, the minimum speed between:
- on the one hand, the sum of the initial required speed for said constrained section and of a predetermined speed margin; and
- on the other hand, a maximum operational speed of VMO type.

By virtue of the consideration of this auxiliary required speed, the low-altitude flight constrained section is rendered flyable at the initial required speed by taking account of said speed margin.

Preferably, this speed margin is the same as that which bounds the speed modulation related to the presence of the time constraint.

Figure 4:
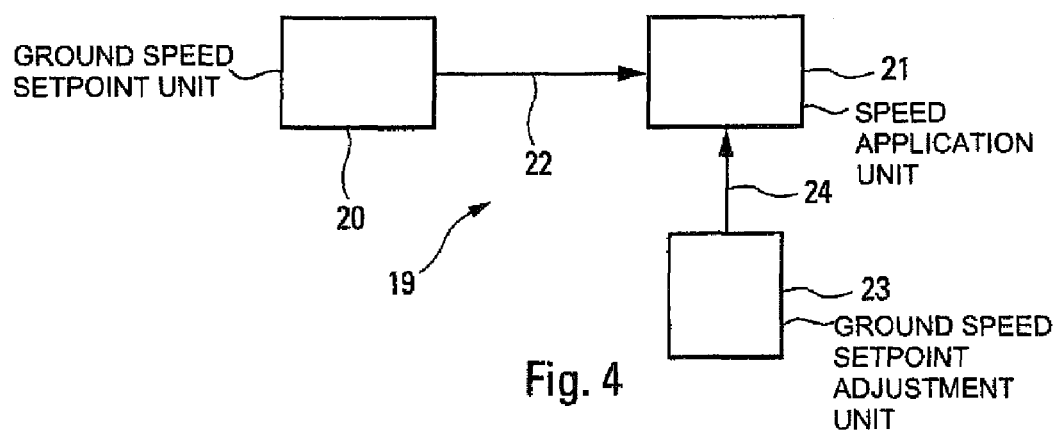
FIG. 4 is the schematic diagram of means forming part of a device in accordance with the invention.

Additionally, in a particular embodiment, said device 1 comprises, moreover, a speed-related guidance set 19, which is able to guide the aircraft A in terms of speed when the aircraft enters a low-altitude flight constrained section of LLF type exhibiting a particular required speed. According to the invention, this set 19 comprises, as represented in FIG. 4:
- means 20 for transforming the required speed into a ground speed setpoint;
- means 21 which are connected by way of a link 22 to said means 20 and which use this ground speed setpoint, as speed setpoint, which is applied to the aircraft A; and adjustment means 23 which are connected by way of a link 24 to said means 21 and which periodically adjust, as a function of an advance or delay information cue also determined in a periodic manner, the ground speed setpoint applied by said means 21 to the aircraft A.

Consequently, as soon as the aircraft A enters a low-altitude flight constrained section SC, the system 4 provides a theoretical speed setpoint (a priori equal to the crew's initial request), thereby implying that the transpose of the constraint has been successfully managed upstream. This speed (a speed of CAS type) is transposed into a ground speed setpoint, then serves as guidance setpoint and is thereafter updated and adjusted as a function of advance (or delay) information cues provided periodically in particular by the flight management system 4.

The aim of the laws for calculating the ground speed setpoint is to ensure that the aircraft A will have compensated for its advance or its delay at a given horizon (in terms of time or distance) ahead of the aircraft A. The dedicated gain adjustment makes it possible to define this horizon and therefore determines the dynamics of the function, thereby inducing more or less crisp variations in ground speed. Preferably, the adjustment of the gains is carried out as a function of the type of aircraft and of its engine dynamics so as to ensure good effectiveness while permitting satisfactory flight comfort.

Figure 5:
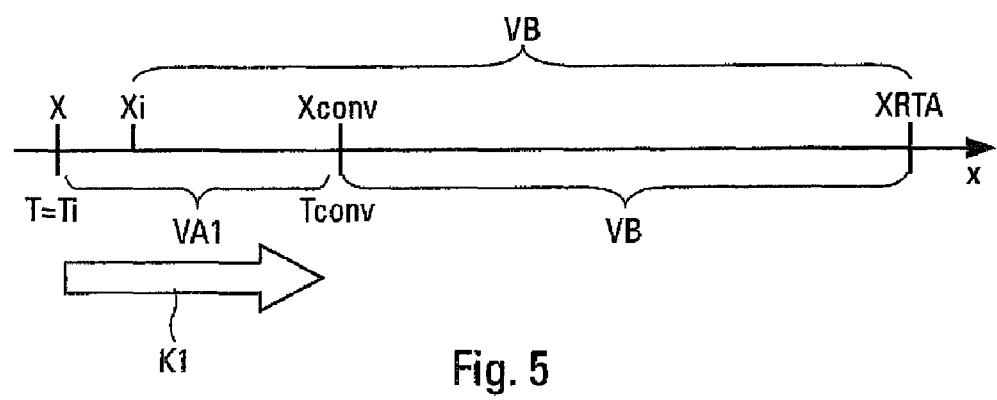
FIGS. 5 and 6 show graphics which relate to two variants of implementation of the particular means of FIG. 4.
Figure 6:
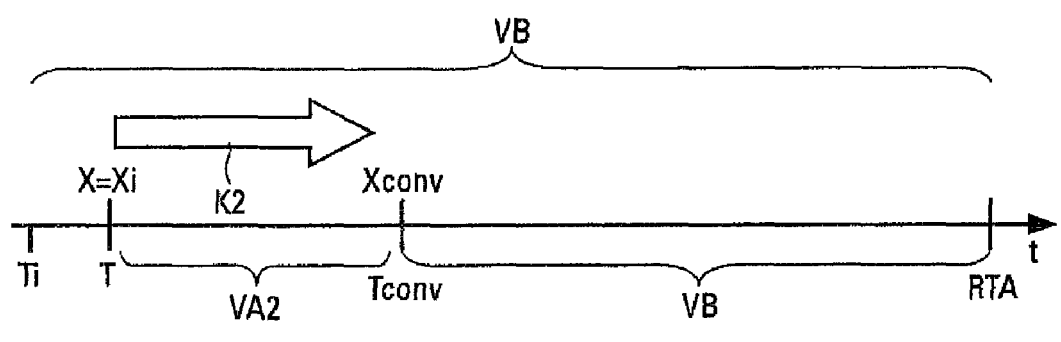

The speed adjustment, implemented by the means 23, consists in determining an adjusted ground speed setpoint, which makes it possible to compensate for the difference between the current position X (at an instant T) and a predicted (at an instant Ti) ideal position Xi of the aircraft A, doing so either for a duration K1 (as represented in FIG. 5) or over a distance K2 (as represented in FIG. 6), up to a virtual convergence point Xconv at a time Tconv.

In the example of FIG. 5 (comprising a distance scale x), the adjusted ground setpoint speed VA1 is obtained on the basis of the following expression:

$$VA1 = VB + (Xi - X)/K1, \text{ } VB \text{ being the predicted speed.}$$
$$VB \text{ is an applicable speed setpoint, and not a distance or speed magnitude.}$$

Furthermore, in the example of FIG. 6 (comprising a time scale t), the ground speed setpoint is adjusted so as to make good the difference over a distance K2. In this case, the adjusted ground setpoint speed VA2 is obtained on the basis of the following expression:

$$VA2 = VB \cdot [1/(1 + VB \cdot (Ti - T)/K2)]$$

In parallel, means of the aircraft A, in particular an automatic pilot 14, inform the flight management system 4 of its current speed setpoint and said system verifies that the setpoint remains within the initially fixed limits. The high limit is that which is used for the calculation of the low-altitude flight constrained section, whereas the low limit is adjusted so as to offer sufficient reaction capability (aircraft A early) without departing too far from the crew's initial setpoint.

In a particular embodiment, the flight management system 4 provides the automatic pilot 14 with the initial speed setpoint as well as with the minimum and maximum values of speed not to be exceeded, thereby allowing the automatic pilot 14 to regulate itself.

The guidance carried out with the aid of a ground speed setpoint exhibits numerous advantages. In particular:

it guarantees compliance with the time constraint RTA with the required precision, for example plus or minus five seconds, and it permits high reactivity in relation to meteorological disturbances such as a headwind or tailwind;

the slaving by ground speed setpoint is rendered independent of the iterative calculation (calculation loop) of the predictions along the flight trajectory TV. The ideal predictions are frozen on entry to the low-altitude flight constrained section SC. The ground position information cue suffices to provide the advance or delay information cue, and therefore makes it possible to correct the ground speed setpoint in a very reactive manner, the calculation cycles being very short. Thus, compliance with the time constraints on the low-altitude flight constrained section (of LLF type) is improved, and consequently so is the success rate of the missions; and the guidance does not require any loop for calculating predictions, thereby easing the workload of the central computer used.

In an alternative operating mode, in manual mode, the pilot manages the speed in place of the automatic pilot 14, and the flight management system 4 generates the information cues for managing the time constraint on the basis of the current speed, and no longer of the setpoint arising from the automatic pilot.

Figure 7:
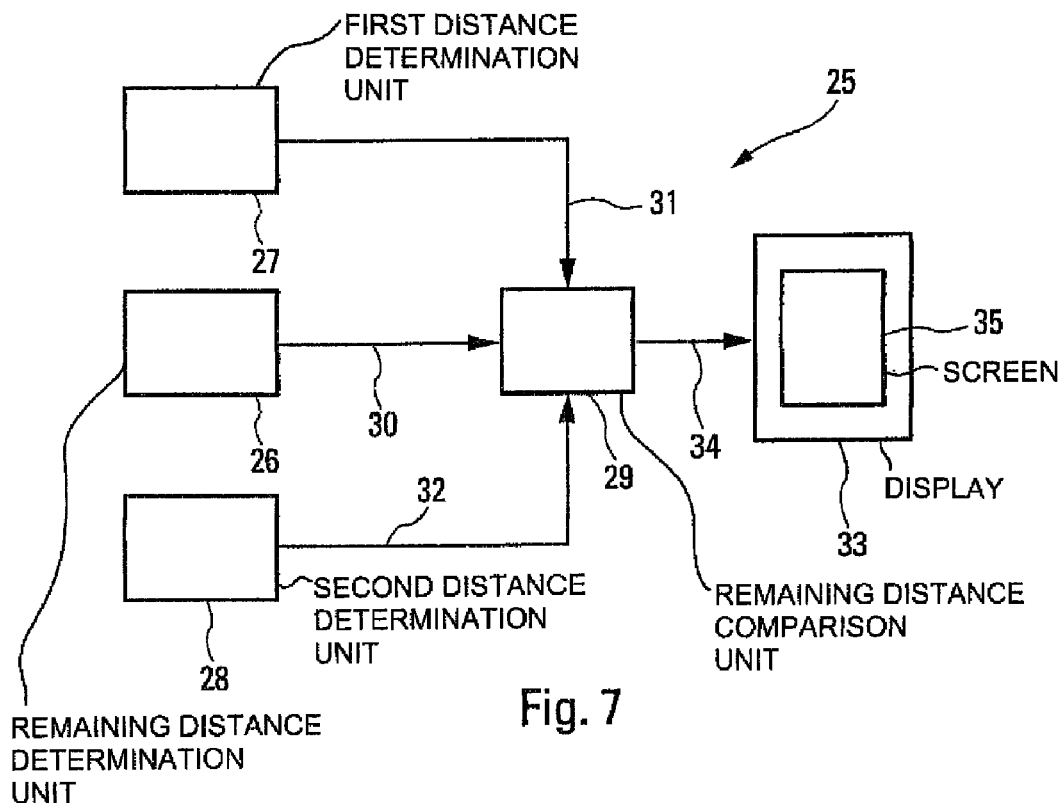
FIGS. 7 and 8 are the schematic diagrams of the means forming part of a device in accordance with the invention, for implementing two different characteristics.

Additionally, in a particular embodiment, the device 1 comprises, moreover, the set 25 represented in FIG. 7. This set 25 comprises:

means 26 for determining a remaining distance which represents the distance remaining to be traversed until the next waypoint with which a time constraint of RTA type is associated;

means 27 for determining a first distance, by multiplying the time remaining until said time constraint by a minimum speed (which represents the required speed for said current constrained section, from which a first speed margin has been subtracted);

means 28 for determining a second distance, by multiplying the time remaining until said time constraint by a maximum speed (which represents the required speed for said current constrained section, to which a second speed margin has been added);

means 29 which are connected by way of links 30, 31 and 32 respectively to said means 26, 27 and 28 and which compare said remaining distance determined on the means 26 with said first and second distances determined by the means 27 and 28, and which conclude:

that said time constraint is realizable, if said remaining distance lies between said first and second distances; and that said time constraint is not realizable, otherwise; and display means 33 which are connected by way of a link 34 to said means 29 and which are formed so as to exhibit a corresponding information cue on a viewing screen 35.

These means 33 can correspond to the means 13 of FIG. 1.

Thus, by virtue of said set 25, the crew of the aircraft A is informed at any moment as to the capability or otherwise of the aircraft A to realize the time constraint.

Figure 8:
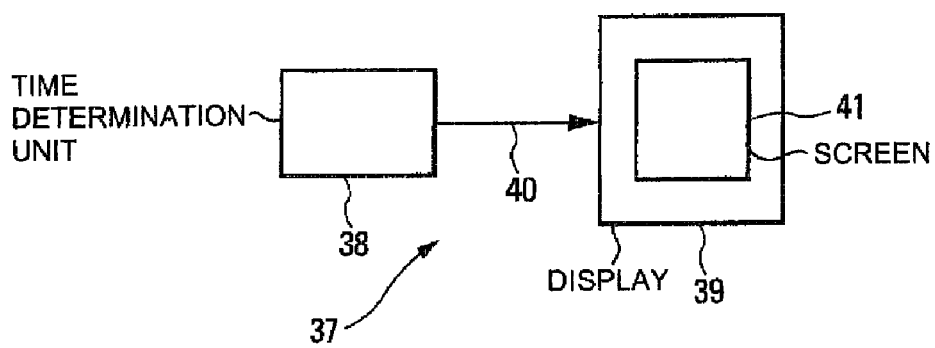

Furthermore, said device 1 comprises, moreover, a set 37 represented in FIG. 8, which comprises:

means 38 for determining, during a flight of the aircraft A along a constrained section, a time deviation between, on the one hand, the arrival time relating to the next time constraint, and, on the other hand, a time corresponding to the ratio between the distance up to the waypoint (which relates to this next time constraint) and a required speed for the current constrained section; and display means 39 which are connected by way of a link 40 to said means 38 and which are able to display on a viewing screen 41 the time deviation determined by said means 38.

Said display means 39 can correspond to the display means 33 of FIG. 7 and/or to the display means 13 of FIG. 1.

Thus, by virtue of this set 37, the crew of the aircraft A knows the time deviation that it is sought to compensate. This time deviation can be negative or positive depending on whether the aircraft A is late or early (delayed or advanced). Moreover, this time deviation can be prohibitive, so that the time constraint is not realizable, when the advance (or the delay) that it is sought to make good involves flying at a lower (or higher) speed than that permitted by the speed margins.

In a particular embodiment, said set 37 can comprise a display differentiated on the value of the time deviation depending on whether the time constraint is or is not realizable, in particular with the aid of a color code or of a blinking display, so as to attract the crew's attention to this information cue.

Furthermore, the device 1 can also comprise means (not represented) for determining and exhibiting on a viewing screen, for example one of the screens 15, 35 and 41, at least one of the following information cues:
- a correction distance to be taken into account in the flight trajectory, between the current position of the aircraft A and a waypoint, so as, if appropriate, to return a speed setpoint to an initial value; and
- a speed value making it possible to satisfy the time constraint by taking account of the advance or the delay aggregated from the start of the flight along the current section.

The previous information cues are useful in particular for rescheduling the current flight plan.

In a particular embodiment, all the previous information cues are available, even if a low-altitude flight is carried out by manual piloting. In this case, the pilot can adjust his current speed so as to compensate for the advance or delay notified to him and he can implement rescheduling actions if this proves to be necessary.

The invention claimed is:

1. A method for guiding an aircraft, comprising:
flying the aircraft along a flight trajectory having at least one constrained section, and flying at a required speed within the constrained section to comply with a required arrival time at a predetermined waypoint in said constrained section according to the additional steps of:
A/ determining speed setpoints by a flight management system, during the flight along said flight trajectory, for guiding the aircraft to arrive at said waypoint at said required arrival time; and
B/ applying the determined speed setpoints during the guidance of the aircraft along said flight trajectory, wherein the flight management system:
determines an auxiliary arrival time for the aircraft to arrive at an auxiliary waypoint, which corresponds to a start point of said constrained section, wherein the determined auxiliary arrival time complies with said required arrival time at the predetermined waypoint, said auxiliary arrival time being determined as a function of the distance between said predetermined waypoint and said auxiliary waypoint and as a function of the required speed in said constrained section; and wherein:
in step A/, auxiliary speed setpoints are determined to guide the aircraft to arrive at said auxiliary arrival time at said auxiliary waypoint; and
in step B/, said auxiliary speed setpoints are applied by a guidance system to guide the aircraft, upstream of said constrained section, so that at said auxiliary arrival time the aircraft arrives at said auxiliary waypoint to comply with said required arrival time, while the aircraft flies at said required speed in said constrained section.

2. The method as claimed in claim 1,
wherein said flight trajectory comprises a plurality of directly successive constrained sections, of which the constrained section that is furthest downstream is associated with a time constraint, wherein auxiliary arrival times are calculated for each of the auxiliary waypoints which correspond to respective starts of each of said constrained sections, from downstream to upstream, and to comply with said time constraint, beginning with the constrained section furthest downstream and using for each subsequent constrained section an auxiliary arrival time determined for start of the preceding downstream section, wherein
in step A/, auxiliary speed setpoints are determined for guiding the aircraft to arrive at the start of the constrained section furthest upstream at the corresponding auxiliary arrival time, and wherein
in step B/, said auxiliary speed setpoints are applied to the aircraft, upstream of said constrained section furthest upstream, so that at said auxiliary arrival time the aircraft is guided to arrive it arrives at said auxiliary waypoint representing the start of said constrained section furthest upstream and to comply with said time constraint, while flying at required speeds along each of said successive constrained sections.

3. The method as claimed in claim 1,
wherein said constrained section is a low-altitude flight section.

4. The method as claimed in claim 3,
wherein, in said low-altitude flight constrained section (SC), an auxiliary required speed is determined that takes into account minimum speed between:
a sum of an initial required speed for said constrained section and of a predetermined speed margin; and
a maximum operational speed.

5. The method as claimed in claim 3,
wherein, when the aircraft (A) enters the low-altitude flight constrained section exhibiting a required speed:
the required speed is transformed into a ground speed setpoint; and the ground speed setpoint is applied as a speed setpoint to the aircraft (A), and
the ground speed setpoint is adjusted as a function of advance or delay information cues which are determined in a periodic manner.

6. The method as claimed in claim 1,
wherein in the course of flying the aircraft along a constrained section:
a time deviation is determined between the arrival time relating to a subsequent time constraint and a time corresponding to a ratio between distance up to the waypoint which relates to the subsequent time constraint and a required speed for the current constrained section; and
the time deviation is presented on a viewing screen of the aircraft.

7. The method as claimed in claim 1,
wherein at least one of the following information cues is determined and presented on a viewing screen of the aircraft:
a correction distance in the flight trajectory between the current position of the aircraft and a waypoint that returns a speed setpoint to an initial value; and
a speed value representative of the time constraint that takes into account advance or delay aggregated from start of flight along the current section.

8. A method for guiding an aircraft, comprising:

flying the aircraft along a flight trajectory having at least one constrained section, and flying at a required speed within the constrained section to comply with a required arrival time at a predetermined waypoint in said constrained section according to the additional steps of:

A/ determining speed setpoints by a flight management system, during the flight along said flight trajectory, for guiding the aircraft to arrive at said waypoint at said required arrival time; and B/ applying the determined speed setpoints during the guidance of the aircraft along said flight trajectory, wherein the flight management system:

determines an auxiliary arrival time for the aircraft to arrive at an auxiliary waypoint, which corresponds to a start point of said constrained section, wherein the determined auxiliary arrival time complies with said required arrival time at the predetermined waypoint, said auxiliary arrival time being determined as a function of the distance between said predetermined waypoint and said auxiliary waypoint and as a function of the required speed in said constrained section, wherein:

in step A/, auxiliary speed setpoints are determined to guide the aircraft to arrive at said auxiliary arrival time at said auxiliary waypoint, and in step B/, said auxiliary speed setpoints are applied by a guidance system to guide the aircraft, upstream of said constrained section, so that at said auxiliary arrival time the aircraft arrives at said auxiliary waypoint to comply with said required arrival time while the aircraft flies at said required speed in said constrained section, and wherein in the course of flying the aircraft along the constrained section:

a remaining distance is determined representing distance remaining to he traversed until a next waypoint with which a time constraint is associated;

a first distance is determined by multiplying time remaining until said time constraint by a minimum speed which represents the required speed for said current constrained section, from which a first speed margin has been subtracted;

a second distance is determined by multiplying time remaining until said time constraint by a maximum speed which represents the required speed for said current constrained section, to which a second speed margin has been added;

said remaining distance is compared with said first and second distances, wherein a determination is made:

that said time constraint is realizable, when said remaining distance lies between said first and second distances; and that said time constraint is not realizable, and a corresponding information cue is presented on a viewing screen of the aircraft (A).

9. A device for guiding an aircraft flying along a flight trajectory, wherein the flight trajectory has at least one constrained section and the aircraft flies at a required speed within the constrained section to comply with a required arrival time at a predetermined waypoint in said constrained section, said device comprising:

a flight management system that determines speed setpoints during the flight along said flight trajectory, for guiding the aircraft to arrive at said waypoint at said required arrival time; and a guidance system which guides the aircraft along said flight trajectory, by applying said speed setpoints, wherein:

said device further comprises, an auxiliary arrival time determination unit that determines an auxiliary arrival time for the aircraft to arrive at an auxiliary waypoint, which corresponds to a start point of said constrained section, wherein the determined auxiliary arrival time complies with said required arrival time at the predetermined waypoint, said auxiliary arrival time being determined as a function of the distance between said predetermined waypoint and said auxiliary waypoint and as a function of the required speed in said constrained section;

said flight management system configured to determine auxiliary speed setpoints for guiding the aircraft to arrive at said auxiliary arrival time at said auxiliary waypoint; and said guidance system configured to apply said auxiliary speed setpoints to the aircraft, upstream of said constrained section (SC), so that at said auxiliary arrival time the aircraft arrives at said auxiliary waypoint to comply with said required arrival time, while the aircraft flies at said required speed in said constrained section (SC).

10. An aircraft, which comprises the device of a claim 9.

* * * * *